US012811676B2

(12) United States Patent
Cassady et al.

(10) Patent No.: US 12,811,676 B2
(45) Date of Patent: Nov. 24, 2026

(54) MEASUREMENT DEVICE INTERFACE COMPONENT

(71) Applicant: VIAVI Solutions Inc., Chandler, AZ (US)

(72) Inventors: Kevin Cassady, Monroe, WA (US); Robert Matthew Adams, Ottawa (CA)

(73) Assignee: VIAVI Solutions Inc., Chandler, AZ (US)

( * ) Notice: Subject to any disclaimer, the term of this patent is extended or adjusted under 35 U.S.C. 154(b) by 287 days.

(21) Appl. No.: 18/612,998

(22) Filed: Mar. 21, 2024

(65) Prior Publication Data

US 2025/0300729 A1 Sep. 25, 2025

(51) Int. Cl.
*G02B 6/38* (2006.01)
*H04B 10/073* (2013.01)

(52) U.S. Cl.
CPC .................................. *H04B 10/073* (2013.01)

(58) Field of Classification Search
CPC ....... G02B 6/385; G02B 6/3825; G01M 11/31
See application file for complete search history.

(56) References Cited

U.S. PATENT DOCUMENTS

2021/0341677 A1* 11/2021 Cassady ................. G02B 6/385
2025/0370193 A1* 12/2025 Cassady ................. G01M 11/31

* cited by examiner

*Primary Examiner* — Kevin K Pyo
(74) *Attorney, Agent, or Firm* — Harrity & Harrity, LLP

(57) ABSTRACT

In some implementations, a measurement device interface component includes at least one bearing to receive a fiber measurement device, wherein the bearing is associated with one degree of freedom around an optical axis of the fiber measurement device, and wherein the fiber measurement device is associated with scanning orthogonally to the optical axis of the fiber measurement device; and an adjustment component to rotate the fiber measurement device within the at least one bearing, such that a direction of scanning orthogonal to the optical axis is alterable from a first angular position to a second angular position.

20 Claims, 5 Drawing Sheets

MEASUREMENT DEVICE INTERFACE COMPONENT

BACKGROUND

Optical communications systems may be deployed to provide high-speed communications between compute nodes of a computing system. For example, computing systems used for artificial intelligence (AI) and machine learning (ML) applications may use optical communications systems to communicate large amounts of data at high speeds. Such optical communications systems may include optical transceivers that transmit and receive data to other optical transceivers via optical fibers. The optical fibers may be provided in an optical fiber array and use Institute of Electrical and Electronics Engineers (IEEE) 802.3 formats, such as a DR type or an SR type. An optical fiber array may include a fiber array connector, which enables multiple optical fibers to be coupled to an input or output port of an optical transceiver.

SUMMARY

In some implementations, a measurement device interface component includes at least one bearing to receive a fiber measurement device, wherein the bearing is associated with one degree of freedom around an optical axis of the fiber measurement device, wherein the fiber measurement device is associated with scanning across orthogonally to the optical axis of the fiber measurement device; and an adjustment component to rotate the fiber measurement device within the at least one bearing, such that a direction of scanning orthogonal to the optical axis is alterable from a first angular position to a second angular position.

In some implementations, a measurement device interface component includes a rotatable structure to attach to a housing of a fiber measurement device and to support a sensor device of the fiber measurement device; a rotational component configured to rotate the rotatable structure about an optical axis of the sensor device of the fiber measurement device; and an adapter to couple the fiber measurement device to a fiber device, the adapter comprising: a first attachment component configured to attach to the fiber measurement device, a second attachment component configured to attach to the fiber device, and a connector component coupling the first attachment component to the second attachment component.

In some implementations, a fiber measurement device includes a housing, wherein the housing includes an opening; a rotatable structure attached to the housing and aligned to the opening; a sensor device disposed in the rotatable structure and aligned to the opening, such that the sensor device is rotatable within the rotatable structure around an optical axis of the sensor device; and a rotational component configured to rotate the sensor device within the rotatable structure.

DETAILED DESCRIPTION

Figure 1A:
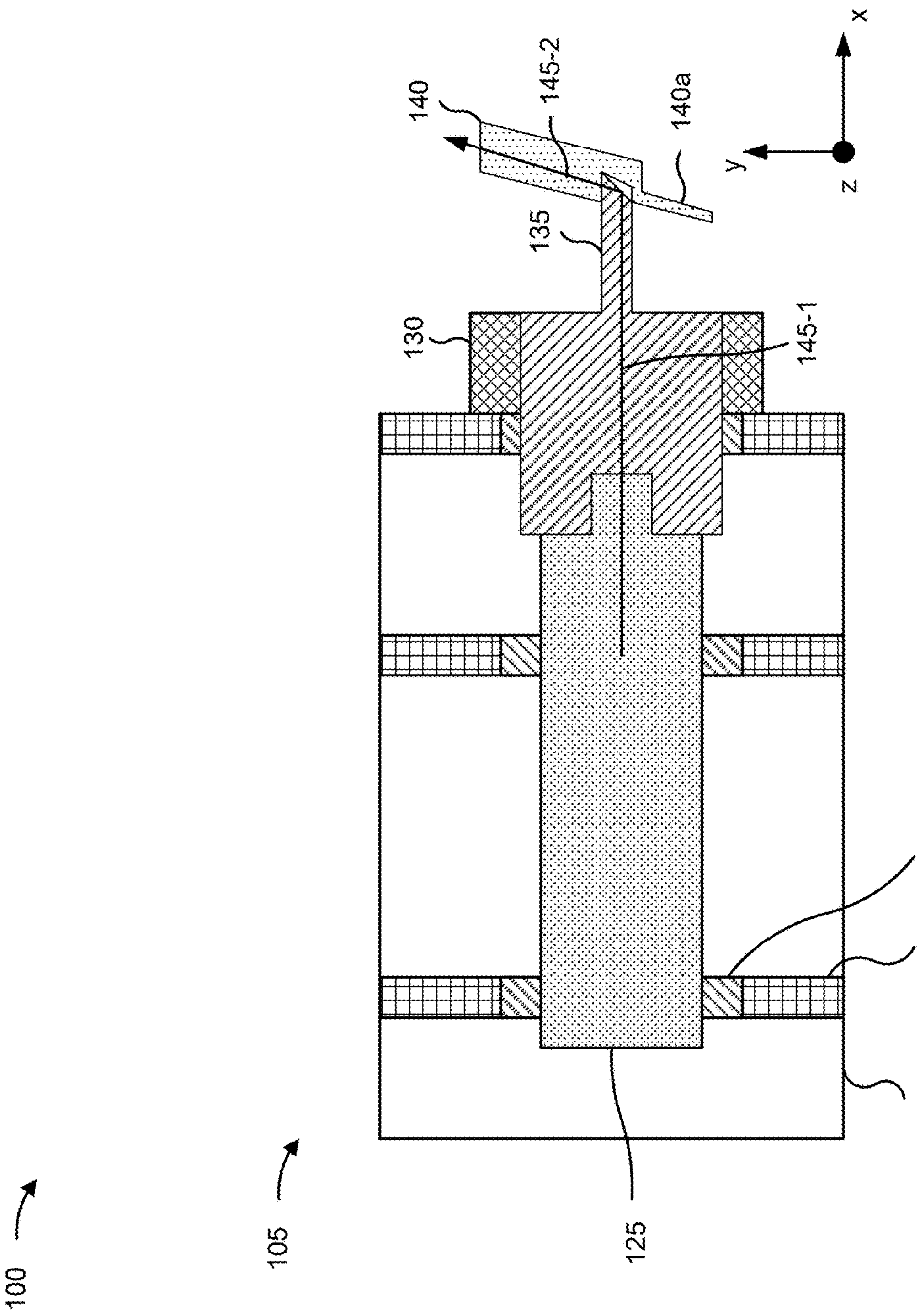
FIGS. 1A-1B are diagrams of an example implementation associated with a measurement device interface component.

The following detailed description of example implementations refers to the accompanying drawings. The same reference numbers in different drawings may identify the same or similar elements. The following description uses a microscopy as an example. However, the techniques, principles, procedures, and methods described herein may be used with any sensor, including but not limited to other optical sensors and microscopic sensors.

Different formats of optical fiber arrays and optical connectors may be used in optical communications systems, such as the DR4 and DR8 optical module physical layer formats. Data centers or cloud computing environments, among other examples, may use optical communications systems for high-speed data transmission, which may be used in artificial intelligence (AI) or machine learning (ML) applications. The DR4 format may utilize an optical fiber array with 4 parallel lanes or channels for data transmission, which may achieve a 400 Gigabit (Gb) link when each lane is configured for a 100 Gb signal. Similarly, the DR8 format may utilize an optical fiber array with 8 parallel lanes for data transmission, which may achieve an 800 Gb link when each lane is configured for a 100 Gb signal.

A connector may be disposed on an end of an optical fiber array to couple the optical fiber array to an optical transceiver. For example, a multi-fiber push-on (MPO) connector may be used for coupling a DR4 format optical fiber array or a DR8 format optical fiber array to an optical transceiver of a computing system. Although some examples are described, herein, in terms of an MPO connector, it is contemplated that implementations described herein may apply to other types of array connectors. Different MPO type connectors, for example, may facilitate different quantities of channels, such as an MPO-16 connector facilitating 16 channels (e.g., 8 transmit channels and 8 receive channels for a DR8 format optical fiber array) or an MPO-12 connector facilitating 12 channels. To achieve high levels of data transmission without introducing errors, an optical fiber array and associated connector may be inspected to ensure there are no manufacturing defects or environmental damage that may affect performance. For example, a fiber measurement device may image an optical fiber array and connector to determine whether a defect is detected in the optical fiber array and connector. The fiber measurement device may detect a presence of dirt, oil, pitting, or scratching, among other examples, which may negatively affect performance of an MPO connector used for an optical fiber array.

Based on a presence of multiple optical fibers in an optical fiber array and connector, a fiber measurement device may be configured to scan horizontally across a face of the optical fiber array and connector to perform a measurement of each optical fiber (and associated end at the connector). The fiber measurement device may have a sensor device to which the connector is attached in a fixed orientation. The fixed orientation is such that the sensor device scans horizontally, across horizontally-oriented optical fibers and the connector, while gravity holds the connector in position on an end of the sensor device. However, some transceivers may employ multiple array connectors that may maintain optical fibers in a vertical orientation, which may prevent horizontal scanning of the fiber measurement device from aligning to each optical fiber.

One technique that can be used to account for connectors with non-horizontal (e.g., vertical) orientations is to rotate a non-horizontal connector to a horizontal position before attaching the non-horizontal connector to the fiber measurement device. In other words, an inspector may attach a dual MPO-12 connector to a socket (or end) of a fiber measurement device at a 90-degree offset such that the optical fibers of the dual MPO-12 connector are in a horizontal orientation and aligned with the scanning orientation of the fiber measurement device. However, positioning a connector at a 90-degree offset may reduce stability of the connector during scanning (e.g., as a result of not being aligned with gravity) and variation in results due to operator care. Accordingly, positioning the connector at a 90-degree offset may result in poor scanning performance. Another technique is to rotate the entirety of the fiber measurement device to a 90-degree offset when measuring a vertically oriented connector. However, rotating a packaging structure of the fiber measurement device may introduce shocks or vibrations that may damage the sensor device of the fiber measurement device. Moreover, as inspectors may inspect both horizontal and vertical connectors on an inspection line, rotating an entirety of the fiber measurement device may lead to cable management issues and may reduce an inspection speed, which may slow down the inspection line.

Further, pull tabs may be provided with fiber devices, such as connectors, to enable an operator to insert and remove a fiber device from a socket of a fiber measurement device. The pull tab is positioned in-line with optics of the fiber measurement device and is moved out of the way to enable microscopy to be performed. However, removing the pull tab can cause the pull tab to jam or become deformed, which may prevent the fiber measurement device from inspecting the fiber device.

Some implementations described herein provide a measurement device interface component. For example, a measurement device interface component may include an adjustment component to rotate a sensor device within the measurement device, thereby repositioning the sensor device from scanning in a horizontal orientation to scanning in a vertical orientation, without rotating the fiber measurement device in which the sensor device is mounted. Additionally, or alternatively, the measurement device interface component may include a mechanical fixture to receive a fiber device, such as a connector and optical fiber array, with the fiber device maintained in an orientation aligned with gravity to ensure stable measurement. The mechanical fixture may include a mirror component that directs light between an end of the fiber device and an end of the sensor device, thereby coupling the fiber device to the sensor device when the sensor device is rotated. In this way, a fiber measurement device can accommodate different types of connectors with different orientations of optical fibers in an optical fiber array. By providing the measurement device interface component, some implementations improve scanning quality and speed relative to rotating the connectors or the fiber measurement device packaging.

Some implementations described herein provide an adapter on an end of the measurement device. For example, an adapter may be inserted into a socket of the measurement device and may extend optics of the measurement device outside of a housing of the measurement device. Accordingly, when a fiber device is to be connected to the fiber measurement device for microscopy, a pull tab associated with the fiber device is not deformed. Accordingly, by providing an adapter on an end of the measurement device, the measurement device may have improved microscopy by reducing a likelihood of interference to microscopy from a damaged, jammed, or deformed pull tab.

Figure 1B:
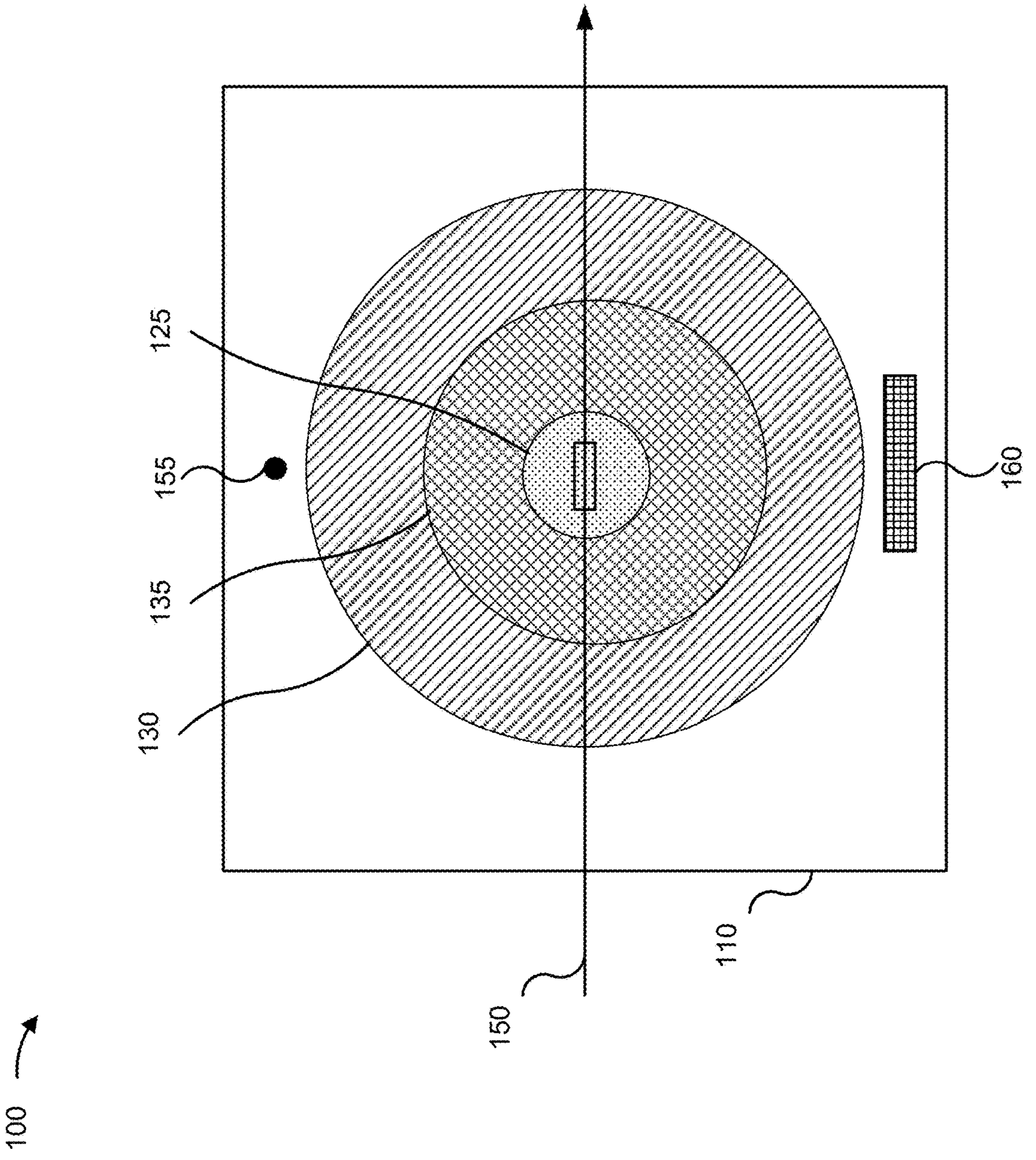

FIGS. 1A-1B are diagrams of an example implementation 100 associated with a measurement device interface component. As shown in FIG. 1A, example implementation 100 includes a fiber measurement device 105, which includes a housing 110, a structure 115, a bearing 120, and a sensor device 125.

As further shown in FIG. 1A, an adjustment component 130 and adapter component 135 may be attached to an end of the fiber measurement device 105. A fiber device 140 may be attached to an end of the adapter component 135 along an optical axis 145 of the sensor device 125. A first component of the optical axis 145-1 may be aligned with an x-axis within the sensor device 125. A second component of the optical axis 145-2 may be redirected by the adapter component 135, as described in more detail herein. In some implementations, the fiber device 140, which may also be referred to as a "device under test" or "DUT", may include a connector and/or an optical fiber array. For example, the fiber device 140 may include an MPO type connector or other array connector.

In some implementations, the sensor device 125 may include a microscopic sensor device, a microscope assembly, an opto-mechanical assembly, or a sensor element for performing microscopy on the fiber device 140. Additionally, or alternatively, the sensor device 125 may include another type of sensor device. In some implementations, the sensor device 125 may include a panning element. For example, the sensor device 125 may be configured to pan, linearly, a sensor element thereof (e.g., a camera or complementary metal oxide semi-conductor (CMOS), among other examples) across a set of fibers or channels of the fiber device 140 to perform microscopy on the set of fibers or channels of the fiber device 140. In some implementations, the panning direction is orthogonal to an optical axis 145. For example, when the optical axis 145-1 is aligned with the x-axis, the sensor device 125 may be configured to pan in a linear path along the z-axis.

In some implementations, the structure 115 and the bearing 120 may form a rotatable structure or movable element. For example, the structure 115 may attach the bearing 120 to the housing 110, and the bearing 120 may receive the sensor device 125 and allow the sensor device 125 to rotate around the optical axis 145-1 of the sensor device 125. In this case, the bearing 120 may be configured to allow the sensor device 125 to rotate between a horizontal orientation for scanning a first type of fiber device and a vertical orientation for scanning a second type of fiber device. In other words, the bearing 120 may rotate the sensor device 125, such that the optical axes 145-1 and 145-2 rotate about the x-axis. Additionally, or alternatively, the bearing 120 may be configured to allow the sensor device 125 to rotate to another set of positions, such as a 0-degree position, a 90-degree position, a 45-degree position, a 180-degree position, or any other arbitrary alignment. In some implementations, the bearing 120 may be a circular, rotatable bearing. In other implementations, other types of bearings may be used.

In some implementations, the bearing 120 may include a stop to prevent the bearing from rotating more than a configured amount (e.g., beyond a configured maximum rotation position). For example, when the sensor device 125 includes one or more connectors (e.g., ribbon electrical connectors) to one or more components within the housing 110, the bearing 120 may avoid rotating more than a configured amount to avoid excess twisting of the one or more connectors. Additionally, or alternatively, the bearing 120 may include a stop to align the sensor device 125 with a pre-configured alignment or a desired orientation. For example, when the fiber measurement device 105 is configured to measure fiber devices 140 with horizontal orientations and vertical orientations, the bearing 120 may be configured with stops to cause the sensor device 125 to be fixed at a 0-degree position (e.g., a horizontal orientation) and a 90-degree position (e.g., a vertical orientation). As shown in FIG. 1B, the sensor device 125 may have a linear axis of panning 150. Accordingly, when the sensor device 125 is turned to a horizontal position, as shown, the axis of panning 150 is horizontal for reading a set of optical fibers in a horizontal arrangement. In contrast, when the sensor device is turned 90 degrees, the axis of panning 150 is vertical for reading a set of optical fibers in a vertical arrangement.

In some implementations, a particular quantity of bearings 120 (and structures 115) may be disposed within a housing 110. For example, the housing 110 may include three pairs of structures 115 and bearings 120. In some implementations, at least one bearing 120 may be coupled with the adjustment component 130. For example, a bearing 120 may be mechanically coupled with the adjustment component 130, such that when the adjustment component 130 is turned, the bearing 120 (and the sensor device 125) is turned. In this case, the adjustment component 130 may turn as a result of a manual turning (e.g., hand turning) or an electrical turning (e.g., turning based on electrical signal or computer-based control). In some implementations, the adjustment component 130 may be disposed at least partially within an opening of the housing 110. For example, the adjustment component 130 may be inserted into the opening of the housing 110 to couple with the sensor device 125. In this case, an outer surface of the adjustment component 130 may be disposed within the opening of the housing 110, and an inner surface of the adjustment component 130 may be shaped to receive the adapter component 135.

In some implementations, the adjustment component 130 may be associated with a set of indicia. For example, the adjustment component 130 or the housing 110 may include an indicium to indicate a configured position for the adjustment component 130 (and the bearing 120 and sensor device 125). For example, as shown in FIG. 1B, and by reference number 155, a visual indicium may be provided in connection with the adjustment component 130. In this case, the visual indicium may be disposed on the adjustment component 130, on the housing 110, or on another component. In some implementations, multiple indicia may be present to indicate multiple configured positions for the adjustment component 130. In some implementations, a tactile indicium may be provided in connection with the adjustment component 130. For example, the adjustment component 130 or the bearing 120 may have a detent (e.g., a mechanical detent, a magnetic detent, or another type of detent), such that a user, when turning the adjustment component 130, can feel when a configured position or desired orientation is reached. Similarly, when the adjustment component 130 is a computer-controlled electrical adjustment component, a detent may be present on or in connection with the adjustment component 130 to divide rotation of the adjustment component 130 into discrete increments corresponding to configured positions.

In some implementations, the adjustment component 130 may be associated with a locking mechanism 160. For example, the locking mechanism 160 may be provided on the housing 110, as shown, the bearing 120, or the adjustment component 130. In this case, the locking mechanism may be associated with maintaining the adjustment component 130, the bearing 120, and the sensor device 125 at a fixed or static position. For example, when scanning a fiber device 140, the sensor device 125 may be maintained at a fixed position with respect to the optical axis 145. By locking the adjustment component 130, the sensor device 125 and, when attached, the fiber device 140, the locking mechanism 160 may improve stability of the sensor device 125 and the fiber device 140. By improving stability of the sensor device 125 and the fiber device 140, the locking mechanism 160 may improve scanning accuracy and/or reduce a likelihood of damaging the fiber device 140 during scanning.

In some implementations, the adapter component 135 may be associated with providing a socket for connecting the fiber device 140. Rather than a pull tab **140*a* of the fiber device 140 being inserted into an opening, socket, or end of the fiber measurement device 105, the adapter component 135 couples the fiber device 140 to the opening, socket, or end of the fiber measurement device 105. Accordingly, the adapter component 135 reduces a likelihood of damage to the pull tab 140*a* when removing the fiber device 140. In some implementations, the adapter component 135 may include a reflective optic. For example, the adapter component 135 may include a mirror that reflects light from the optical axis 145-1 to the optical axis 145-2 and vice versa. In this way, the pull tab 140*a* is maintained outside the fiber measurement device 105 and channels or fibers of the fiber device 140 are positioned in the optical axis 145-2 for microscopy by the sensor device 125. In other words, the pull tab clears any physical interference by the fiber measurement device 105. When the adjustment component 130 rotates, the adapter component 135 may rotate, resulting in the optical axis 145-2 being rotated from a 0-degree position in the xy plane, as shown, to a 90-degree position in, for example, the xz plane (while the optical axis 145-2** rotates around and remains aligned with the x-axis).

In some implementations, the adapter component 135 may include a hinge component. For example, the adapter component 135 may have a hinge at an outer end of the adapter component 135 to rotate the outer end of the adapter component 135 relative to the inner end of the adapter component 135 (e.g., to rotate the outer end of the adapter component 135 around the z-axis). In this case, by rotating the outer end of the adapter component 135 around the z-axis, the adapter component 135 can change an angle in the xy plane at which the fiber device 140 is attached to the adapter component 135. In this way, the adapter component 135 can accommodate different shapes or sizes of fiber devices 140, such that pull tabs of the fiber devices 140 clear the housing 110.

In some implementations, the adapter component 135 may have one or more differently-oriented ends for receiving fiber devices 140. For example, a first end of the adapter component 135 may have a vertically-oriented attachment component to attach to a vertically-oriented fiber device or a horizontally-oriented attachment component to attach to a horizontally-oriented fiber device. In some implementations, a single adapter component 135 may have an attachment component that can be rotated to both a vertical orientation and a horizontal orientation (or any other set of multiple orientations). A second end of the adapter component 135 may include another attachment component configured to couple to the sensor device 125 of the fiber measurement device 105. For example, the adapter component 135 may include a threaded screw that is screwed into the adjustment component 130 and/or onto the sensor device 125 or the bearing 120, thereby coupling the adapter component 135 to the sensor device 125. In some implementations, the adapter component 135 and/or the adjustment component 130 may include a magnetic connector to attach to a magnetic receiver of the housing 110. In other words, the adapter component 135 may magnetically snap onto the housing 110 and/or the sensor device 125. Between the first end of the adapter component 135 that receives the fiber device 140 and the second end of the adapter component 135 that receives or couples to the sensor device 125, the adapter component 135 may include a connector, such as a light pipe to direct light along the optical axis 145 between the sensor device 125 and the fiber device 140.

In some implementations, the adapter component 135 may be positioned within an opening of the adjustment component 130 and the housing 110. For example, the housing 110 may include a circular opening and the adjustment component 130 may be a toroid shape or ring shape aligned to the circular opening of the housing 110 and mounted to a sensor head of the sensor device 125. In this case, the adapter component 135 can be inserted into the circular opening of the housing 110 and within the inner ring shape of the adjustment component 130 to enable coupling of fiber devices 140 to the sensor device 125 for testing. When the adjustment component 130 is rotated, the adjustment component may rotate the sensor device 125 within the bearings 120 and may rotate the adapter component 135 within the circular opening.

As indicated above, FIGS. 1A-1B are provided as an example. Other examples may differ from what is described with regard to FIGS. 1A-1B. The number and arrangement of devices shown in FIGS. 1A-1B are provided as an example.

Figure 2:
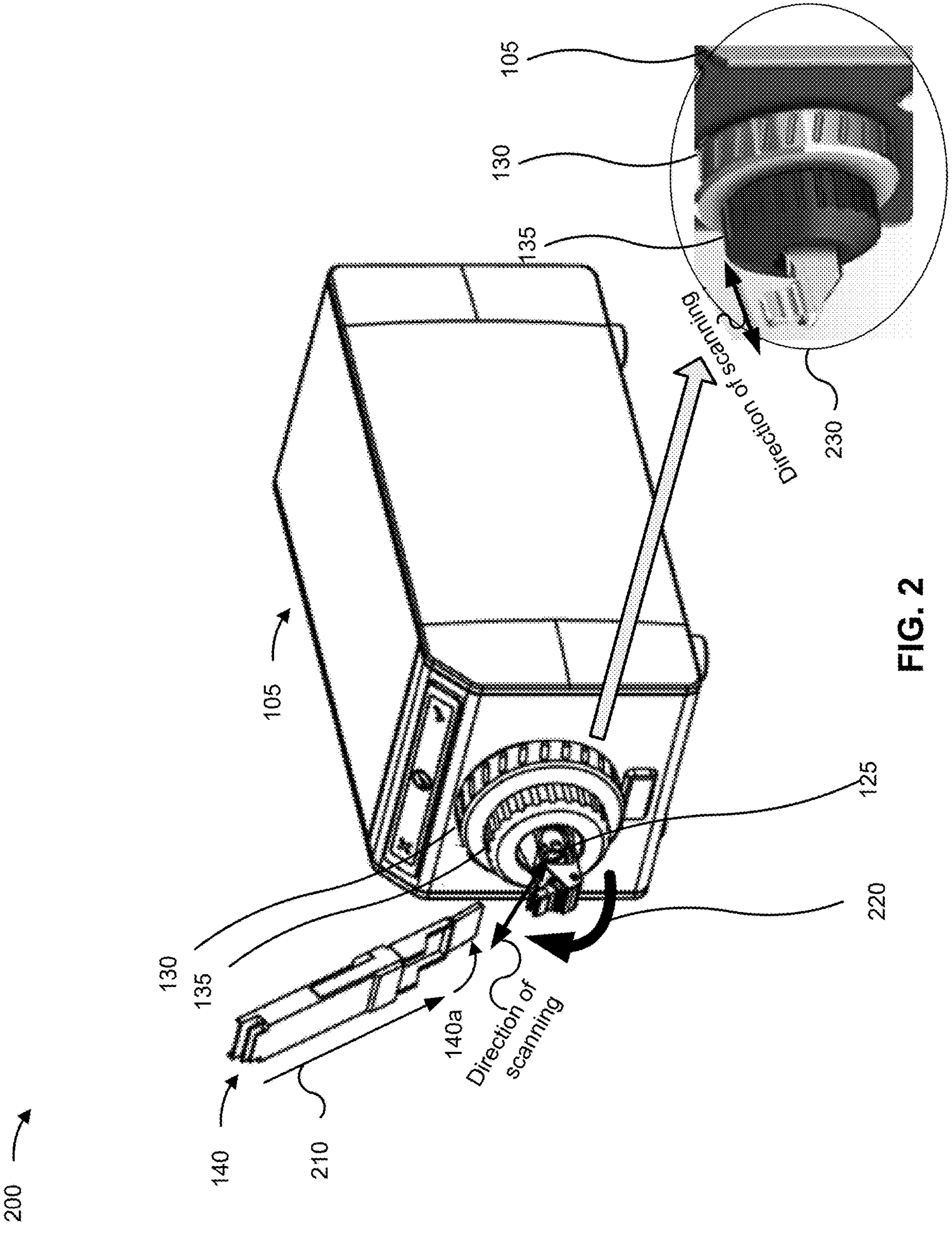
FIG. 2 is a diagram of an example implementation associated with a measurement device.

FIG. 2 is a diagram of an example implementation 200 associated with a measurement device. As shown in FIG. 2, example implementation 200 includes the fiber measurement device 105, which includes the sensor device 125, the adjustment component 130 and the adapter component 135, and the fiber device 140. As shown by reference number 210, in a first configuration, a horizontally-oriented fiber device 140 is attached to an attachment component of the fiber measurement device. For example, an end piece of the adapter component 135 may be configured to receive an end of the fiber device 140 (e.g., an MPO connector). In this case, the sensor device 125 may perform horizontal scanning in a first orientation with respect to an optical axis of the sensor device 125. As shown by reference number 220, the adjustment component 130 may be turned to rotate the sensor device 125 and/or at least a portion of the adapter component 135 with respect to the optical axis of the sensor device 125. As shown by reference number 230, in a second configuration, the end piece of the adapter component 135 may be configured to receive an end of a vertically-oriented fiber device 140 and the sensor device 125, having been rotated 90 degrees, may scan vertically.

As indicated above, FIG. 2 is provided as an example. Other examples may differ from what is described with regard to FIG. 2. The number and arrangement of devices shown in FIG. 2 are provided as an example.

Figure 3A:
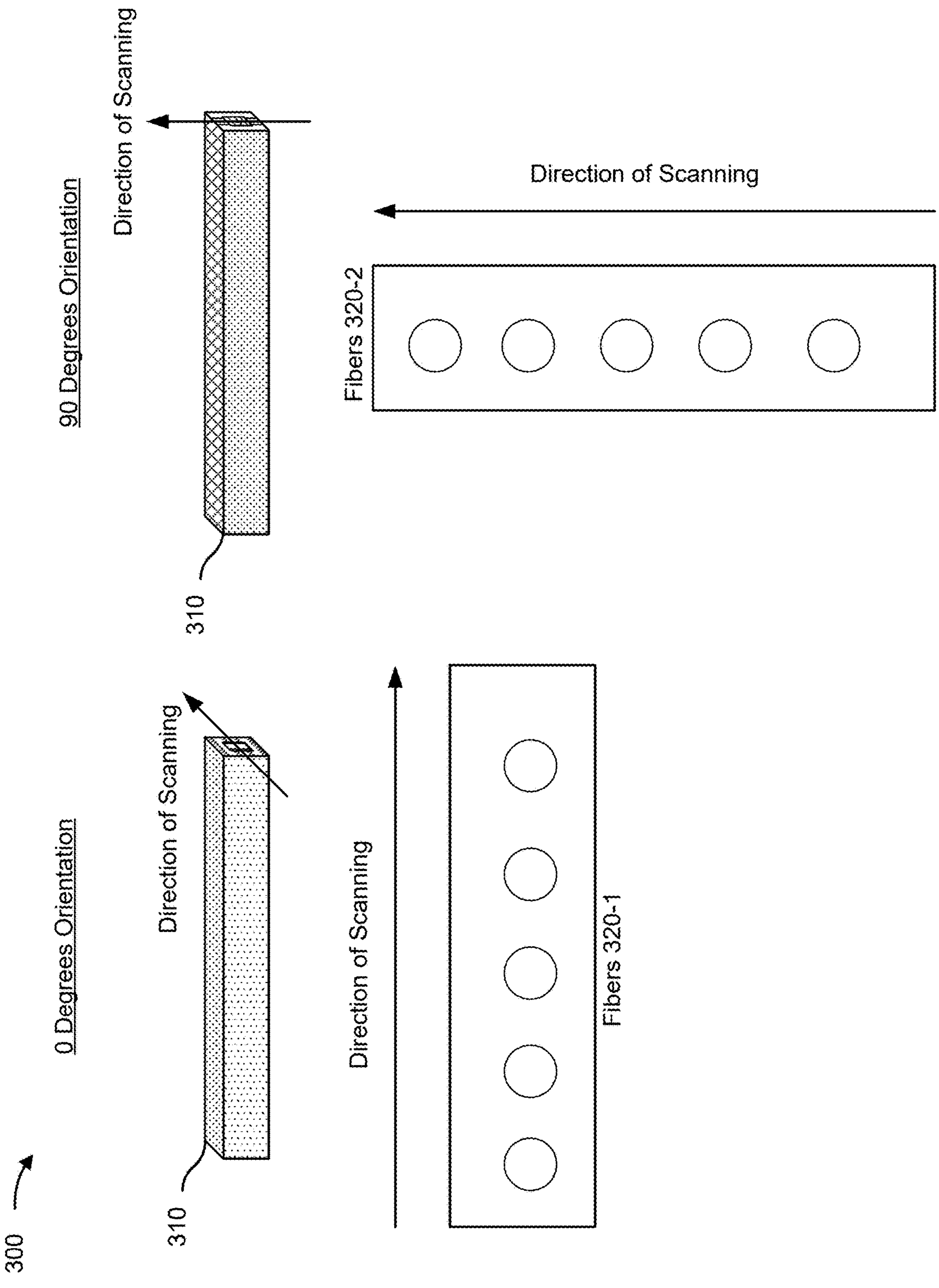
FIGS. 3A-3B are diagrams of an example implementation associated with rotation of a sensor device within a fiber measurement device.
Figure 3B:
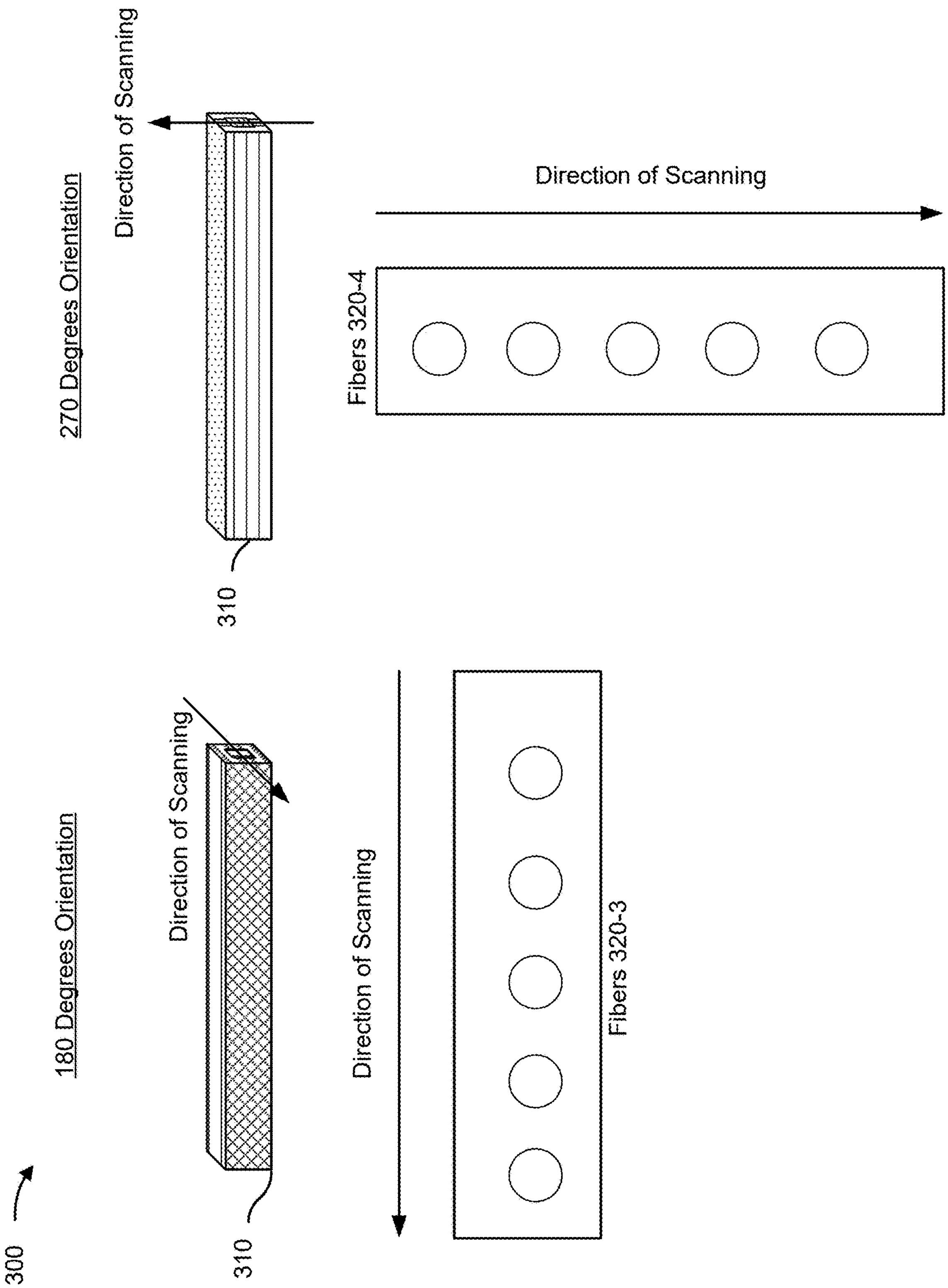

FIGS. 3A-3B are diagrams of an example implementation 300 associated with rotation of a sensor device 310 within a fiber measurement device. In some implementations, the rotation of the sensor device 310 may be performed by a measurement device interface component, as described herein. As shown in FIG. 3A, in a 0-degree orientation, the sensor device 310 may perform rightward scanning of a first set of fibers 320-1. For example, the sensor device 310 may perform a microscopy procedure to detect defects in the first set of fibers 320-1. Additionally, or alternatively, the sensor device 310 may perform another type of scanning, such as spectroscopy or the like. In a 90-degree orientation, the sensor device 310 may perform upward scanning of a second set of fibers 320-2. As a result of rotation the sensor device 310 (e.g., using a measurement device interface component), the sensor device 310 can measure fibers 320-2 with a vertical orientation despite having only one panning direction of freedom with respect to performance of scanning. Similarly, as shown in FIG. 3B, in a 180-degree orientation, the sensor device 310 performs leftward scanning of a third set of fibers 320-3, and performs downward scanning of a fourth set of fibers 320-4.

Although some implementations are described herein in terms of a set of 90-degree offsets, in other implementations a measurement device interface component may adjust the sensor device 310 to any configured orientation to match a configuration of a fiber device, such as an MPO connector and associated fiber array. Additionally, although some implementations are described herein in terms of a particular quantity of orientations, in other implementations a measurement device interface component may be adjusted to any quantity of orientations, including a discrete set of orientations or a continuous range of orientations.

As indicated above, FIGS. 3A and 3B are provided as examples. Other examples may differ from what is described with regard to FIGS. 3A and 3B. The number and arrangement of devices shown in FIG. 3 are provided as an example.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A measurement device interface component, comprising:

at least one bearing to receive a fiber measurement device,
 wherein the bearing is associated with one degree of freedom around an optical axis of the fiber measurement device,
 wherein the fiber measurement device is associated with scanning orthogonally to the optical axis of the fiber measurement device; and an adjustment component to rotate the fiber measurement device within the at least one bearing, such that a direction of scanning orthogonal to the optical axis is alterable from a first angular position to a second angular position.

2. The measurement device interface component of claim 1, further comprising:

an opening to receive an adapter, the adapter being configured to receive a fiber device for measurement by the fiber measurement device,
 wherein the opening is configured such that a rotation of the fiber measurement device within the bearing by the adjustment component is configured to rotate an orientation of the adapter.

3. The measurement device interface component of claim 1, wherein the adjustment component includes:

a manual adjustment component, or an computer-controlled electrical adjustment component.

4. The measurement device interface component of claim 1, wherein the adjustment component further comprises:

a set of indicia identifying a desired orientation of a fiber device in the optical axis of the fiber measurement device.

5. The measurement device interface component of claim 4, wherein the desired orientation is a vertical orientation.

6. The measurement device interface component of claim 4, wherein the set of indicia includes at least one of:

a visual indicium, or a tactile indicium.

7. The measurement device interface component of claim 1, wherein the adjustment component is configured to be disposed at least partially within an opening of the fiber measurement device.

8. The measurement device interface component of claim 1, wherein the adjustment component is associated with a toroid shape, such that an outer surface of the adjustment component is configured to be disposed within an opening of the fiber measurement device and an inner surface of the adjustment component is configured to mount to an adapter for a sensor head of the fiber measurement device.

9. The measurement device interface component of claim 1, wherein the adjustment component is configured to rotate between a first position and a second position, the second position being offset from the first position by 90 degrees around the optical axis of the fiber measurement device.

10. The measurement device interface component of claim 1, further comprising:

a locking mechanism to lock the measurement device interface component in a static position.

11. A measurement device interface component, comprising:

a rotatable structure to attach to a housing of a fiber measurement device and to support a sensor device of the fiber measurement device;

a rotational component configured to rotate the rotatable structure about an optical axis of the sensor device of the fiber measurement device; and an adapter to couple the fiber measurement device to a fiber device, the adapter comprising:
 a first attachment component configured to attach to the fiber measurement device,
 a second attachment component configured to attach to the fiber device, and
 a connector component coupling the first attachment component to the second attachment component.

12. The measurement device interface component of claim 11, further comprising:

a hinge component to rotate a position of the second attachment component relative to the first attachment component and orthogonally to the optical axis of the sensor device of the fiber measurement device.

13. The measurement device interface component of claim 11, wherein the first attachment component includes a magnetic connector to attach to a magnetic receiver of the fiber measurement device.

14. The measurement device interface component of claim 11, wherein the first attachment component includes a threaded screw to attach to the fiber measurement device.

15. The measurement device interface component of claim 11, wherein the rotatable structure includes a plurality of rotatable bearings configured to receive the sensor device of the measurement device.

16. The measurement device interface component of claim 15, wherein a bearing, of the plurality of rotatable bearings, is associated with a maximum rotation position.

17. The measurement device interface component of claim 11, wherein the connector component comprises a light pipe.

18. The measurement device interface component of claim 11, wherein the adapter includes a reflective optic.

19. The measurement device interface component of claim 18, wherein the reflective optic is a mirror.

20. The measurement device interface component of claim 11, wherein the second attachment component is configured to be rotated to a vertical orientation and a horizontal orientation.

* * * * *